United States Patent [19]

Harris

[11] 3,921,296
[45] Nov. 25, 1975

[54] DENTAL DRILL SWIVEL

[76] Inventor: William H. Harris, 4513 S. Pennsylvania, Oklahoma City, Okla. 73119

[22] Filed: Jan. 2, 1974

[21] Appl. No.: 429,987

[52] U.S. Cl. .................................................. 32/27
[51] Int. Cl.² ........................................... A61C 1/08
[58] Field of Search ............ 285/275, 278, 280, 281; 32/26, 27

[56] References Cited
UNITED STATES PATENTS

| 1,203,630 | 11/1916 | Koenig | 285/275 |
| 1,987,499 | 1/1935 | Tabozzi | 285/280 |
| 3,521,359 | 7/1970 | Harris | 32/28 |

Primary Examiner—Robert Peshock
Attorney, Agent, or Firm—Robert K. Rhea

[57] ABSTRACT

In a dental drill having a head with a drill bit secured therein and having a handle extending from the head and at least one fluid conduit connected with the handle, a swivel is interposed in the fluid conduit adjacent its handle connected end which prevents torque forces being imparted to the conduit when the handle is rotated about its longitudinal axis in manipulating the drill head while drilling. The respective end portions of the swivel are easily separated from one another.

1 Claim, 5 Drawing Figures

DENTAL DRILL SWIVEL

BACKGROUND OF THE INVENTION

1. Field of the Invention

The present invention relates to dental instruments and more particularly to dental drills having one or more fluid conduit lines connected to the handle of the drill opposite the drill head.

The drill head of a dental drill has components therein rotating a chuck or collet holding a detachably secured drill bit. These components must necessarily be kept lubricated to insure efficient operation. These components are normally operated by a supply of air under greater than atmospheric pressure applied to the dental drill by a conduit connected to the handle end opposite the drill head. It has generally been the practice to lubricate the drill head components by adding a small quantity of oil in asperator spray form to the pressurized air supply. This has not been generally satisfactory for the reason that the oil is not applied to the drill head in sufficient quantities to maintain it properly lubricated.

2. Description of the Prior Art.

Dental drills are generally provided with at least one fluid conduit connected with the drill handle for supplying air to the drill head through a tube extending longitudinally through the handle. Some dental drills, particularly those rotating the dental drill bit at a relatively fast angular rate of rotation, are provided with a second conduit similarly connected with the drill handle which supplies a stream of fluid, usually water, to the surface being drilled to reduce heat generated by the drill bit cutting action. In a dental drill using two such conduits the torque applied to the conduits, as a result of rotating the drill handle about its longitudinal axis during manipulations of the drill, generates a force agains the dentist's hand which must be overcome in maintaining the drill bit in a desired location. This is tiring on the dentist's hand and wrist and it has been proposed to connect at least one of the conduits, preferably the larger air supply conduit, to the drill handle through a swivel to reduce the torque applied to the conduit, such as is disclosed by my U.S. Pat. No. 3,521,359. However, the swivel disclosed by this patent is less than satisfactory principally for the reason that the respective end portions of the swivel are permanently secured together and do not swivel as freely as is desired.

This invention overcomes this difficulty by providing a connection between adjacent ends of swivel forming sleeves which permits, in addition to rotative movement of the swivel sleeves with respect to each other, a certain freedom of lateral movement of each end of the swivel with respect to the other while maintaining a seal sufficient to maintain the flow of air constant and to easily separate the swivel ends from each other when desired.

SUMMARY OF THE INVENTION

The swivel comprises a first sleeve having a bore therethrough and a counterbore in one end of the sleeve. A second swivel sleeve, having a cooperating bore therethrough and an annular flange intermediate its ends, is provided with a plug-like end portion for loosely entering the counterbore in the first sleeve. A flanged coupling surrounds the counterbored end portion of the first sleeve and impinges an O-ring seal against the counterbored end of the first sleeve. The plug-like end portion of the first sleeve is provided with a shallow circumferential groove removably sealing with the innerperiphery of the O-ring whereby the plug may be easily removed and inserted through the O-ring permitting the second sleeve to revolve about its longitudinal axis while the first sleeve remains stationary. The respective ends of the first and second sleeve, opposite their respective swivel connected ends, are adapted to be inserted into and gripped by adjacent ends of flexible conduits connected at their other ends to a dental drill handle and a source of air supply, respectively.

The principle objects of the invention are to render manipulation of the drill handle about its longitudinal axis more easily accomplished by decreasing torque forces normally applied to fluid conduits connected to the drill handle for reducing wrist and arm fatigue of the dentist while using the drill and permitting access to the bore of at least one of the conduits by separating the swivel components for lubricating the swivel seal forming components and the drill head components.

Figure 4:
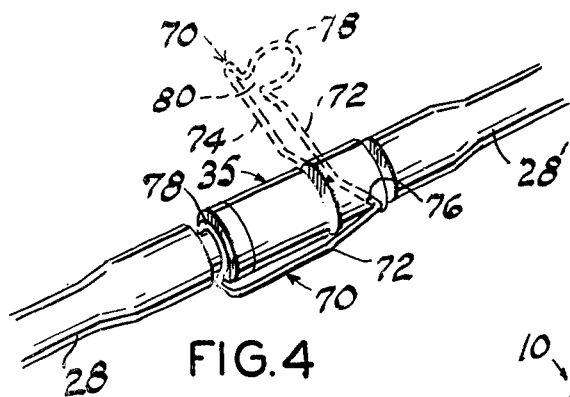
Figure 1:
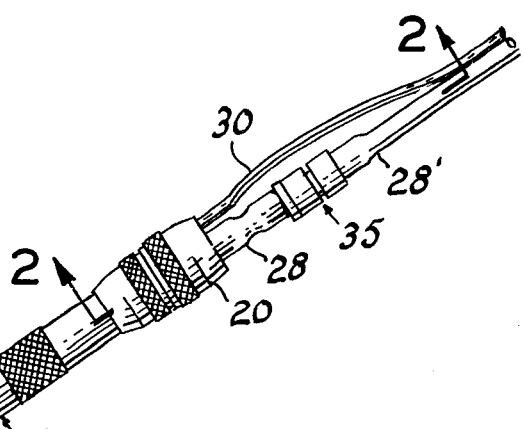
FIG. 1 is an elevational view of a dental drill having a pair of fluid conduits connected with its handle including a swivel in one of the conduits.
Figure 5:
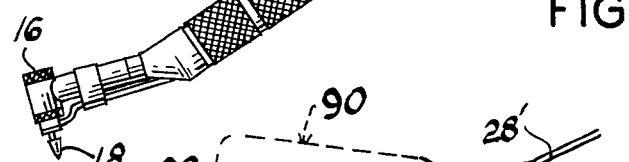
Figure 3:
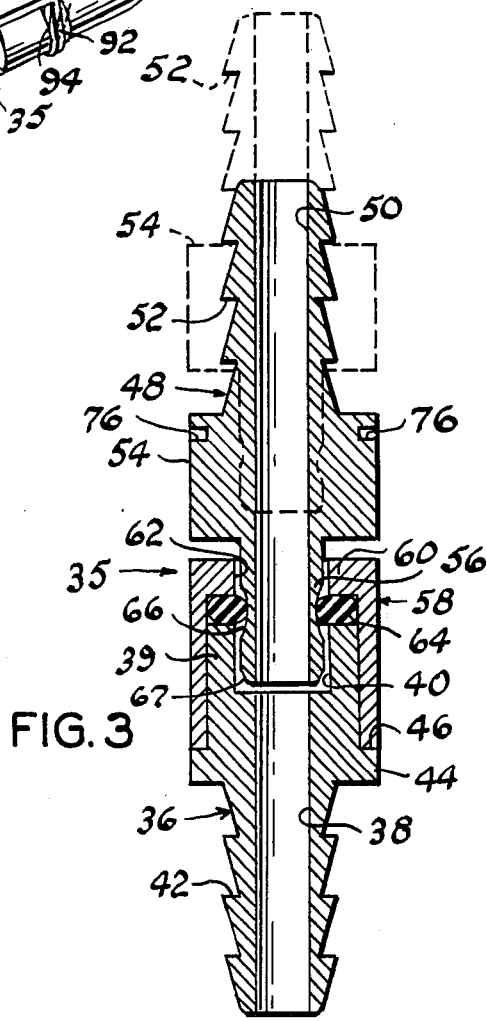

FIG.. 2 is a fragmentary longitudinal cross-sectional view, to a larger scale, partially in elevation, taken substantially along the line 2—2 of FIG. 1;

FIG. 3 is a longitudinal cross-sectional view of the swivel, per se, illustrating, by dotted lines, one sleeve of the swivel separated from theother; and, FIGS. 4 and 5 are fragmentary perspective views, to a different scale, respectively illustrating swivel locking means with the respective locking means being illustrated, by dotted lines, in a swivel unlocked position.

DESCRIPTION OF THE PREFERRED EMBODIMENT

Like characters of reference designate like parts in those figures of the drawings in which they occur.

In the drawings:

The reference numeral 10 indicates a contra-angle dental drill, as a whole, having an elongated tubular handle or shank portion 12, having a drill head 16 at one end containing a chuck or collet which removably receives a drill bit 18. The other end of the handle 12 is provided with a collar 20 connected with the handle which secures a tube plate 22 to the drill handle. The tube plate 22 is provided with a pair of tube connectors 24 and 26 which respectively receive one end portion of fluid conduits 28 and 30. The conduit 28 is an air supply conduit and the conduit 30 is a water supply conduit. The conduits 28 and 30 are normally secured together in longitudinal juxtaposed relation for convenience in handling and operation with their end portions adjacent the tube plate being separated for ease in connecting them to the tube plate. Thus, it may be seen that when the drill handle 12 is rotated about its longitudinal axis a torque is applied to the conduits 28 and 30 with the tubes tending to resist the rotating torque applied thereto. The swivel, generally indicated at 35, is interposed in the conduit 28 by transversely severing it so that the swivel end portions may be disposed within the respective adjacent end portions of the short conduit 28 and longer conduit 28' in the manner presently explained.

The swivel 35 comprises a first sleeve 36 having a longitudinal bore 38 which is counterbored from its head end 39, as at 40. The other end portion of the first sleeve 36 is diametrically reduced and provided with a plurality of spaced-apart substantially conventional circumferential shoulders 42 for entering the bore of the conduit 28 and be retained thereby by the resilience of the conduit. The counterbored end portion of the sleeve 36 is diametrically reduced to form an annular flange 44 intermediate its ends and an annular shoulder 46 facing toward the counterbored end of this sleeve.

A second or companion sleeve 48, having a longitudinal bore 50 diametrically equal with respect to the first sleeve bore 38, has one diametrically reduced end portion similarly provided with circumferential shoulders 52 adapted to enter the bore of and be gripped by the resilience of the conduit 28'. The other end portion of the second sleeve 48 is diametrically reduced to form an annular flange 54 intermediate the length of the second sleeve and a plug-like end portion 56 which loosely enters the counterbore 40.

A coupling 58 closely surrounds the head portion 39 of the first sleeve and abuts, at one end, the annular shoulder 46 thereon. The coupling is provided, at its other end, with an inwardly directed flange 60 having a bore 62 diametrically substantially equal with respect to the counterbore 40.

A sealing ring, such as an O-ring 64, is interposed between the coupling annular flange 60 and adjacent end surface of the first sleeve head 39 so that the major portion of the cross sectional area of the O-ring is under some compression. The inside diameter of the O-ring is preferably slightly less than the outside diameter of the plug 56.

The plug 56 is provided, intermediate its ends, with a shallow circumferential recess or groove 66 having lateral limits, of the plug surface defining the groove, arcuately curved to merge with the peripheral surface of the plug. The purpose of the groove 66 is to nest the inner peripheral surface of the O-ring 64 and form a seal therewith. The periphery of the plug, adjacent its end within the counterbore 40, is chamfered or rounded-off, as at 67, for easily inserting the plug into the O-ring 64. The diameter of the plug 56 is preferably less than the inside diameter of the counterbore 40 and coupling flange bore 62 a distance great enough to permit some lateral movement of either sleeve in a tilting action, as viewed in FIG. 3, of its longitudinal axis with respect to the longitudinal axis of the other sleeve. Further, the position of the groove 66 with respect to the end of the plug opposite the second sleeve flange 54 is such that this end of the plug is normally maintained in spaced relation with respect to the inner end surface or limit of the counterbore 40. The overall length of the plug 56 is such that the adjacent end surface of the flange 54 is disposed in spaced relation with respect to the adjacent end surface of the coupling 58. Thus, either sleeve 36 or 38 may be rotated about its longitudinal axis with respect to the other sleeve and further the sleeve can be easily separated and rejoined by manually pulling the plug 56 axially out of contact with the O-ring and reinserting it therethrough.

Referring also to FIG. 4, the numeral 70 indicates a swivel locking means comprising a wire clip formed of resilient material, such as piano wire or spring steel.

The clip 70 is U-shaped in general configuration having its respective legs 72 and 74 arranged generally parallel and disposed on opposite sides of the assembled swivel. The end portion of each leg 72 and 74 is turned inwardly, at right angle, and is nested by suitable sockets 76 formed in diametric opposition in the outer surface of the swivel sleeve flange 54 (FIG. 3). The major portion of the bight portion of the wire clip is turned laterally of the plane defined by the clip legs 72 and 74 and arcuately curved in part circular fashion to form a loop, as at 78, for transversely surrounding an arc of at least 190° of the diametrically reduced end portion of the other swivel sleeve 36 adjacent its annular flange 44. The plane of the loop 78 is normal to the axis of the swivel and is characterized by a neck or opening 80 dimensioned slightly smaller than the outside diameter of the reduced portion of the swivel sleeve which it surrounds so that the wire material must be flexed laterally outward in diametric opposite directions when being frictionally engaged with and released from the swivel sleeve 36.

Referring more particularly to FIG. 5, the reference numeral 90 indicates a swivel locking means comprising a strip of metal in substantially a U-shaped configuration with one of its legs 92 having an aperture 94 loosely surrounding the tube 28' and having its other leg 96 provided with an opening or slot 98 for frictionally surrounding a major circumferential portion of the diametrically reduced end portion of the sleeve member 36 adjacent its flange 44 and opposite the sleeve 48. Both of the swivel locking means 70 and 90 must be manually pivoted laterally toward their dotted line positions before the swivel sleeves 36 and 48 may be separated.

OPERATION

Figure 2:
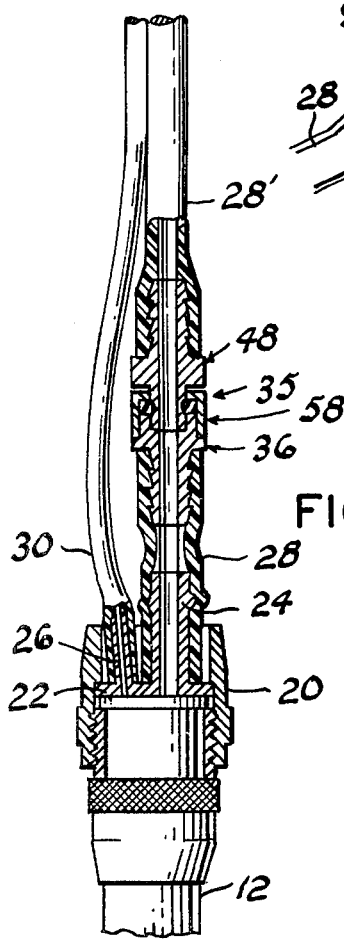

In operation the swivel 35, when interposed between the conduits 28 and 28', as shown in FIG. 2, permits rotation of the handle about its longitudinal axis by rotating the first sleeve 36 with respect to the second sleeve 48 wherein torque applied to the drill handle results in a wraparound action of the small conduit 30 with respect to the conduit end portions 28, 28' and the swivel. The locking means 70 and 90 prevents accidental separation of the swivel components. The O-ring and plug 56, at their point of contact, is maintained lubricated by simply separating the second sleeve from the first sleeve, after first pivoting the removable end portion of the locking means in a lateral direction, and applying a mist of oil from an aspirator to the plug 56 and O-ring 64. A portion of the oil mist is carried by the air flow through the conduit 28 to and tends to lubricate the components of the drill head.

Obviously the invention is susceptible to changes or alterations without defeating its practicability, therefore, I do not wish to be confined to the preferred embodiment shown in the drawings and described herein.

I claim:

1. In combination with a dental drill having a drill handle, a drill head secured to one end of the handle, a drill bit supported by the drill head and at least one conduit for conveying fluid to the drill handle, the improvement commprising:

a first swivel sleeve having a bore therethrough and connected, at one end, with said drill handle, the other end of said first sleeve having a counterbore therein and having an annular flange intermediate its ends;

a second swivel sleeve having a bore therethrough and having one end portion extending into and frictionally engaging said one conduit, the other end portion of said second sleeve forming a plug portion loosely received by the counterbore in said first sleeve, said plug portion having a circumferential groove intermediate its ends, the depth of the groove being relatively shallow when compared with the diameter of the plug portion;

a coupling closely surrounding the counterbored end of said first sleeve, one end of said coupling abutting the annular shoulder on said first sleeve, said coupling having an inwardly projecting flange at its other end disposed in spaced relation with respect to the counterbored end of said first sleeve and defining an opening diametrically substantially equal with respect to the diameter of the counterbore;

an O-ring having the major portion of its cross sectional area interposed and compressed between the counterbored end of said first sleeve and the inwardly projecting flange of said coupling, the inner peripheral surface of said O-ring sealing with the smallest peripheral surface of the groove of said plug portion, the surface of the plug portion forming the side walls of the groove being arcuately curved longitudinally of the plug portion for ease in entering and release from said O-ring when the plug portion is inserted into and removed from the counterbore, said plug portion having a tapered end surface converging toward its longitudinal axis at its end disposed within the counterbore, said O-ring forming the sole connecting contact between said first and second sleeves and constituting a swivel connection permitting relative angular rotation and axial separation and joining of said first and second sleeves, said second swivel sleeve having a cylinder-like annular flange intermediate its ends diametrically substantially equal with the diameter of said coupling and having its end surface facing said coupling normally disposed in spaced relation with respect to the adjacent end surface of said coupling for permitting axial tilting movement of said second swivel sleeve with respect to the axis of said first swivel sleeve without separation of the plug portion from within said O-ring; and, swivel locking means comprising a U-shaped member having arcuate legs, and pivotally connected by one of its end portions with one said swivel sleeve, said member having another end portion adapted for frictionally engaging the other said swivel sleeve.

* * * * *